United States Patent
Kommers et al.

(10) Patent No.: US 8,301,642 B2
(45) Date of Patent: *Oct. 30, 2012

(54) INFORMATION RETRIEVAL FROM A COLLECTION OF INFORMATION OBJECTS TAGGED WITH HIERARCHICAL KEYWORDS

(75) Inventors: Jefferson M. Kommers, Somerville, MA (US); David Freed, Somerville, MA (US); Damien Paul Kennedy, Central City (NZ)

(73) Assignee: Open Text, S.A., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 12/628,132

(22) Filed: Nov. 30, 2009

(65) Prior Publication Data

US 2010/0077000 A1     Mar. 25, 2010

Related U.S. Application Data

(63) Continuation of application No. 11/221,608, filed on Sep. 8, 2005, now Pat. No. 7,627,558, which is a continuation of application No. 09/682,107, filed on Jul. 20, 2001, now Pat. No. 7,028,024.

(51) Int. Cl.
  *G06F 7/00* (2006.01)
  *G06F 17/30* (2006.01)
(52) U.S. Cl. ........................... 707/749; 707/738
(58) Field of Classification Search ............... 707/999.1, 707/738, 749; 704/8, 9
See application file for complete search history.

(56) References Cited

U.S. PATENT DOCUMENTS

| | | |
|---|---|---|
| 2,404,510 A | 7/1946 | Long |
| 4,769,772 A | 9/1988 | Dwyer |
| 4,837,831 A | 6/1989 | Gillick et al. |
| 5,138,615 A | 8/1992 | Lamport et al. |
| 5,619,709 A | 4/1997 | Caid et al. |
| 5,630,125 A | 5/1997 | Zellweger |
| 5,649,186 A | 7/1997 | Ferguson |
| 5,655,130 A | 8/1997 | Dodge et al. |
| 5,752,021 A | 5/1998 | Nakatsuyama et al. |
| 5,774,888 A | 6/1998 | Light |
| 5,778,400 A | 7/1998 | Tateno |
| 5,787,417 A | 7/1998 | Hargrove |
| 5,799,268 A | 8/1998 | Boguraev |

(Continued)

FOREIGN PATENT DOCUMENTS

EP     0601 550 A2     7/1993

OTHER PUBLICATIONS van Rijsbergen, "Information Retrieval", 2nd Ed., Butterworths, Chapter 3, pp. 1-26, 1979.

(Continued)

*Primary Examiner* — Usmaan Saeed
*Assistant Examiner* — Navneet K Ahluwalia
(74) *Attorney, Agent, or Firm* — Sprinkle IP Law Group

(57) ABSTRACT

The present invention can include a data processing system-implemented method or a data processing system readable media having software code for carrying out the method. The method can comprise formulating queries, searching for a plurality of information objects, or a combination thereof. In a specific embodiment, an original query with at least one keyword can be automatically expanded to an expanded query that includes at least one keyword that is not in the original query. The expanded query may be used to search for information objects that are relevant to the expanded query.

17 Claims, 4 Drawing Sheets

U.S. PATENT DOCUMENTS

| | | | |
|---|---|---|---|
| 5,857,179 | A | 1/1999 | Vaithyanathan et al. |
| 5,875,334 | A | 2/1999 | Chow et al. |
| 5,875,441 | A | 2/1999 | Nakatsuyama |
| 5,893,109 | A | 4/1999 | DeRose et al. |
| 5,920,879 | A | 7/1999 | Kyojima et al. |
| 5,940,822 | A | 8/1999 | Haderle et al. |
| 5,940,842 | A | 8/1999 | Sakuta |
| 5,956,726 | A | 9/1999 | Aoyama et al. |
| 5,970,490 | A | 10/1999 | Morgenstern |
| 5,991,756 | A | 11/1999 | Wu |
| 6,009,436 | A | 12/1999 | Motoyama et al. |
| 6,012,098 | A | 1/2000 | Bayeh et al. |
| 6,018,710 | A | 1/2000 | Wynblatt et al. |
| 6,023,714 | A | 2/2000 | Hill et al. |
| 6,047,280 | A | 4/2000 | Ashby et al. |
| 6,052,693 | A | 4/2000 | Smith et al. |
| 6,055,538 | A | 4/2000 | Kessenich et al. |
| 6,072,801 | A | 6/2000 | Wood, Jr. et al. |
| 6,094,652 | A | 7/2000 | Faisal |
| 6,098,066 | A | 8/2000 | Snow et al. |
| 6,098,071 | A | 8/2000 | Aoyama et al. |
| 6,108,676 | A | 8/2000 | Nakatsuyama |
| 6,128,617 | A | 10/2000 | Lowry |
| 6,169,986 | B1 | 1/2001 | Bowman et al. |
| 6,182,077 | B1 | 1/2001 | Tokumine et al. |
| 6,327,593 | B1 | 12/2001 | Goiffon |
| 6,389,436 | B1 | 5/2002 | Chakrabarti et al. |
| 6,510,406 | B1 * | 1/2003 | Marchisio .................... 704/9 |
| 6,523,028 | B1 | 2/2003 | DiDomizio et al. |
| 6,631,496 | B1 * | 10/2003 | Li et al. .................... 715/200 |
| 6,816,857 | B1 * | 11/2004 | Weissman et al. .................... 1/1 |
| 6,862,710 | B1 * | 3/2005 | Marchisio .................... 715/206 |
| 7,028,024 | B1 | 4/2006 | Kommers et al. |
| 7,627,558 | B2 | 12/2009 | Kommers et al. |

OTHER PUBLICATIONS van Rijsbergen, "Information Retrieval", 2nd Ed., Butterworths, Chapter 5. pp. 1-14, 1979.

Marden, Philip, and Munson, Ethan, "Multiple Presentations of WWW Documents Using Style Sheets," Proceedings of the Workshop on New Paradigms in Information Visualization and Manipulation, Nov. 1997, pp. 75-78.

"Microsoft Press Computer Dictionary Third Edition," Definition of the word 'tree,' 1997, p. 477.

Lee, et al., "Index Structures for Structured Documents," Proceedings of the First ACM International Conference on Digital Libraries, Mar. 1996, pp. 91-99.

Aho, A.V., Hopcraft, J.E., and Ullman, J.D. "Data Structures and Algorithms," Reading, Addison Wesley, 1983. pp. 78-82. QA76.9. D35A38.

Thompson, Henry S.: "An Introduction to XSL: Slides from a talk to SGML UK" from http://www.ltg.ed.ac.uk/~ht/swindon.html. Oct. 27, 1997, Sections 5,6,9.

Lee, Yong Kyu: "Querying Structured Documents." System Sciences, 1996. Proceedings of the Twenty-Ninth Annual Hawaii Conference on System Sciences, vol. 2, pp. 155-164.

Office Action issued in U.S. Appl. No. 09/682,107, mailed Mar. 11, 2003, 7 pgs.

Office Action issued in U.S. Appl. No. 09/682,107, mailed Jun. 23, 2003, 8 pgs.

Office Action issued in U.S. Appl. No. 09/682,107, mailed Nov. 10, 2003, 8 pgs.

Office Action issued in U.S. Appl. No. 09/682,107, mailed Sep. 1, 2004, 10 pgs.

Office Action issued in U.S. Appl. No. 09/682,107, mailed Feb. 9, 2005, 8 pgs.

Office Action issued in U.S. Appl. No. 09/682,107, mailed Jul. 7, 2005, 9 pgs.

Office Action issued in U.S. Appl. No. 11/221,608, mailed Apr. 3, 2008, 11 pgs.

Office Action issued in U.S. Appl. No. 11/221,608, mailed Dec. 8, 2008, 13 pgs.

Office Action issued in U.S. Appl. No. 11/221,608, mailed Mar. 18, 2009, 12 pgs.

* cited by examiner

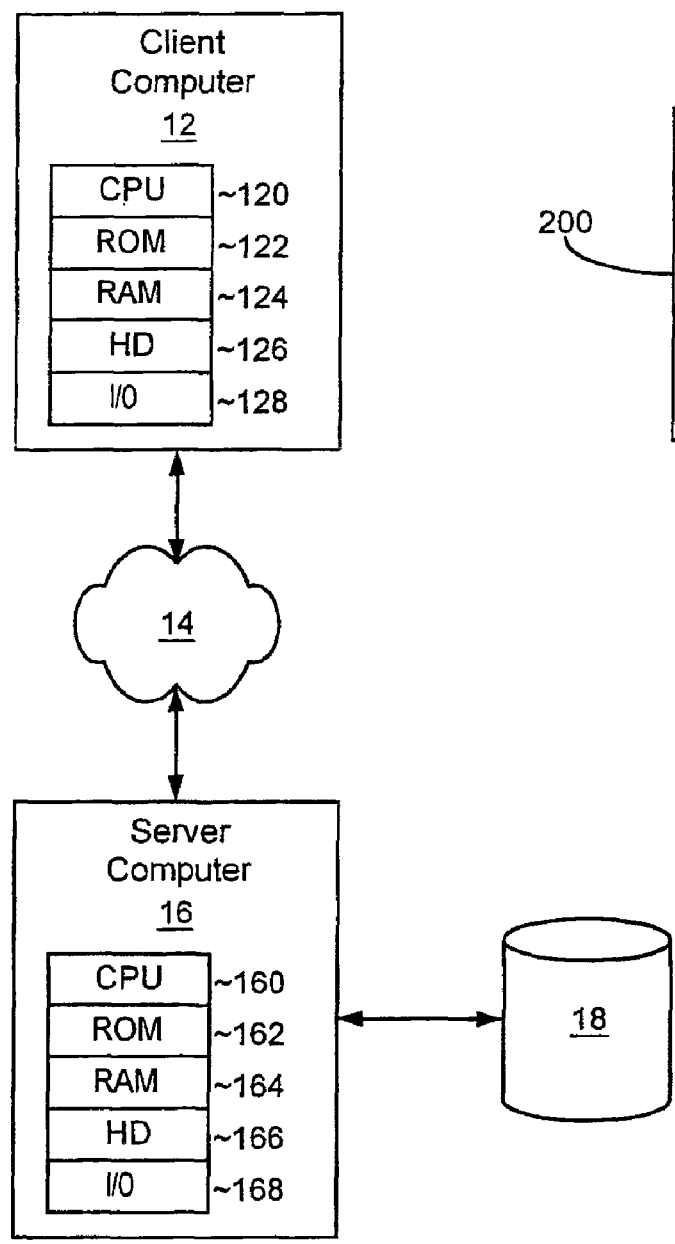
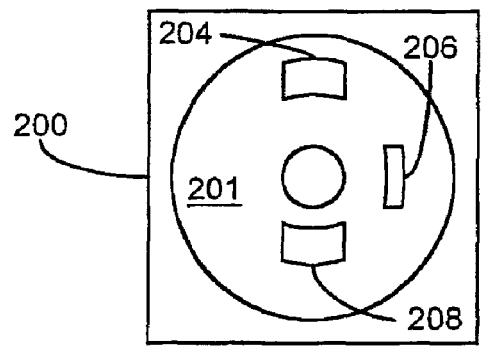
FIG. 2
FIG. 1

INFORMATION RETRIEVAL FROM A COLLECTION OF INFORMATION OBJECTS TAGGED WITH HIERARCHICAL KEYWORDS

CROSS-REFERENCE TO RELATED APPLICATIONS

This is a continuation of and claims a benefit of priority under 35 U.S.C. 120 of the filing date of U.S. patent application Ser. No. 11/221,608, filed Sep. 8, 2005, now U.S. Pat. No. 7,627,558, entitled "INFORMATION RETRIEVAL FROM A COLLECTION OF INFORMATION OBJECTS TAGGED WITH HIERARCHICAL KEYWORDS," which is a continuation of U.S. patent application Ser. No. 09/682,107, filed Jul. 20, 2001, issued as U.S. Pat. No. 7,028,024, entitled "INFORMATION RETRIEVAL FROM A COLLECTION OF INFORMATION OBJECTS TAGGED WITH HIERARCHICAL KEYWORDS," both of which are fully incorporated by reference herein.

BACKGROUND OF INVENTION

1. Field of the Invention

This invention relates in general to methods and data processing system readable media, and more particularly, to data processing system-implemented methods of formulating queries and searching for a plurality of information objects and data processing system readable media having software code for carrying out those methods.

2. Description of the Related Art

A goal of information retrieval systems is to allow efficient access to selected documents or other kinds of information objects from a repository. The user of such a system may be interested in knowing the existence and location of the available information objects that are relevant to a specific request or query.

A common approach used in information retrieval systems is to associate one or more keywords with each information object. The set of all known keywords comprises the "master set" of keywords. To form a query, the user provides one or more keywords, which may or may not be drawn from the master set. The information retrieval system then returns each information object for which one or more of its associated keywords match one or more of the keywords in the query. As a further step, a mathematical formula can be applied to the number of keyword matches to provide a scalar that is associated with each information object returned by the query. The scalar serves as a "relevance score" that indicates the degree to which the particular information object matches the query. This approach can be generally termed "keyword-matching" and there are many specific embodiments used in practice. Some difficulties with the keyword-matching approach are set forth in the following paragraphs.

First, the user of the system may not know or be able to grasp all of the possible keywords in the master set. In this case, the user may provide queries that contain keywords that are not used in the master set. This reduces the effectiveness of the system, particularly when the master set includes keywords that have closely related meanings in a particular application, and a simple match cannot make use of this information. For example, assume the repository contains documents describing fruits and vegetables, and a treatise on tomatoes has been assigned the keyword "nightshade" because it also includes discussions of eggplant and potatoes. The user desiring information on tomatoes might enter a query such as "tomatoes" and this query would fail to match the treatise on the nightshade family, even though that document is relevant to the user's purpose.

Second, the mathematical formulae that are widely described and used to compute relevance scores may not take advantage of the relationships among keywords that are inherent in any specific information repository. For example, given a repository that contains documents on fruits and vegetables, systems that compute a relevance score based only on the number of keyword matches have no way to incorporate the fact that a document tagged with keywords "nightshade" and "treatise" should more closely match the query pair "tomato" and "treatise" than the query pair "lamp" and "treatise." Attempts to address these shortcomings have been proposed, but the methods fail to fully address the problems users may encounter. Some systems have been developed that organize the keywords into a hierarchical tree structure. This, by itself, is not a solution, as will become evident in some of the paragraphs that follow.

A system described in U.S. Pat. No. 6,094,652 ("Faisal") places keywords into a hierarchical structure. The hierarchy expresses the associations among the keywords in the repository. When responding to a user query, the system suggests keywords from the hierarchy that broaden or narrow the scope. The system also suggests keywords that represent concepts that are neither broader nor narrower but are related by means of an explicit cross-link among the nodes in the keyword hierarchy. The user can refine his or her query in an interactive and iterative fashion.

A system described in U.S. Pat. No. 6,098,066 ("Snow") arranged the information objects into a document hierarchy (a tree data structure). Each node of the hierarchy corresponds to a category and contains at least one document. The user of the system has the option of restricting their search to the documents branching from a specific category (which these authors term a "directed" search) or searching all documents in the repository (which these authors term an "undirected" search). The user may restrict the number of documents returned by the system by focusing on a particular category, while leaving the user with the option of searching the entire repository if desired.

A system described in U.S. Pat. No. 5,991,756 ("Wu") places documents into a hierarchical structure. The system retrieves documents that match one or more query keywords directly or match "indirectly" by being located as a child node to a document in the document hierarchy that matches directly one or more of the query terms.

A system described in U.S. Pat. No. 5,630,125 ("Zellweger") places documents into a hierarchical structure that has one or more paths leading to a given document. The system provides an interactive method that allows the user to formulate a final query by navigating the hierarchy structure to the desired documents. Multiple paths support synonyms and allow the user to clarify word meaning in a given context.

A system described in U.S. Pat. No. 5,787,417 ("Hargrove") is highly similar to that described by Zellweger in that it provides an interface for allowing the user to interactively navigate the hierarchy of the repository to locate the desired information objects.

A textbook by C. J. Van Rijsbergen (Information Retrieval, 2 .sup.nd Ed) describes a general strategy for information retrieval by keyword matching. It also gives the mathematical formulae that can be used to transform the combination of a "query vector" and a "document vector" into a final "relevance score" that can be used to rank the documents returned by a retrieval system according to their degree of relevance to the query.

Each of the systems in those documents has at least one limitation or disadvantage in some applications.

Systems that require the user to interactively refine their query (such as those described by Faisal, Zellweger, and Hargrove) are inherently more time consuming for the user than a system that returns results in response to a single query. Further, human interfacing with a computer costs a company valuable human resources. In some applications (such as those described in the next section), the information retrieval is automated, and there is no opportunity to refine or otherwise change the query before searching begins.

Systems that restrict the retrieved documents to those with a particular ancestry in a document hierarchical structure (such as those described by Faisal, Snow, and Wu) can fail to return relevant documents outside their hierarchical search path unless there have been many cross-links provided (such as in the system described by Faisal). Cross links must be created and maintained manually, a time-consuming and error-prone process.

Several of the prior systems do not prescribe a method for assigning a relevance score between the query and the documents in the repository (such as the systems described by Zellweger and Hargrove). It is often convenient for the users to have a relevance score to help them estimate their level of interest in the returned documents. Furthermore, systems that restrict the search path to a particular set of child nodes in the hierarchy (such as that described by Wu) cannot provide relevance scores for documents that lie outside the restricted set of child nodes. In some applications, this means that not all documents can be assigned a relevance score in response to a given query.

SUMMARY OF INVENTION

Embodiments of the present invention do not suffer from the problems seen with prior art methods and systems. A user is not required to interactively refine a search because a data processing system can be programmed to automatically expand an original query having original keywords to an expanded query that includes friend keywords of the original keywords. Searching may be performed that cover parts of one or more hierarchies because keywords outside a specific ancestry may be used. Further, the documents are not required to be placed within a document hierarchy. A cross-link system is not required, which saves valuable money and human resources.

In one set of embodiments, a data processing system-implemented method of searching for a plurality of information objects can comprise receiving a first signal that includes or is used to form a first query. The first query may include a first keyword within a hierarchy. The method can also comprise expanding the first query to a second query. The second query may include the first keyword and a second keyword within the hierarchy. The method can further comprise searching the database using the second query and finding a first identifier for a first information object that corresponds to the second query.

In another set of embodiments, a data processing system-implemented method of formulating a query can comprise receiving a first signal that includes or is used to form a first query having a first keyword. The method can also comprise automatically expanding the first query to a second query. The second query may include the first keyword and a second keyword that is not present within the first query.

In still other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only and are not restrictive of the invention, as defined in the appended claims.

BRIEF DESCRIPTION OF DRAWINGS

The accompanying drawings, which are incorporated in and constitute a part of this specification, illustrate embodiments of the invention and together with the description, serve to explain the principles on of the invention.

FIG. 1 includes an illustration of a hardware architecture for carrying out methods of searching a database;

FIG. 2 includes an illustration of a data processing system storage medium including software code;

Figure 3:
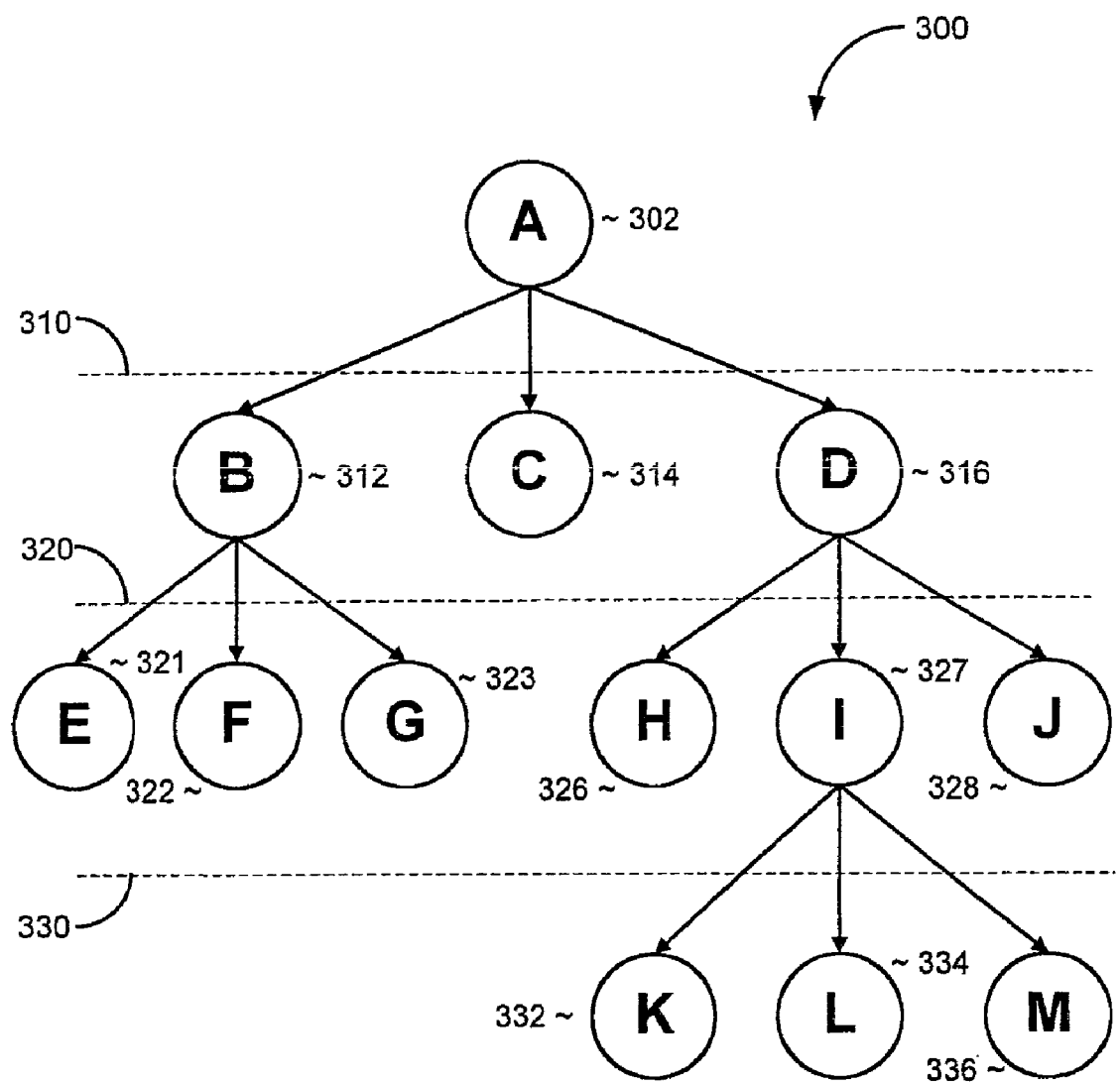
FIG. 3 includes an illustration of a hierarchy of keywords.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

The present invention can include a data processing system-implemented method or a data processing system readable media having software code for carrying out the method. The method can comprise formulating queries, searching for a plurality of information objects, or a combination thereof. In a specific embodiment, an original query with at least one keyword can be automatically expanded to an expanded query that includes at least one keyword that is not in the original query. The expanded query may be used to search for information objects that are relevant to the expanded query.

Before discussing embodiments of the present invention, a hardware architecture for using embodiments is described. FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168.

Each of the client computer 12 and the server computer 16 are examples of data processing systems. ROM 122 and 162, RAM 124 and 164, HD 126 and 166, and the database 10 include media that can be read by the CPU 120 or 160. Therefore, each of these types of memories includes a data processing system readable medium. These memories may be internal or external to the computers 12 and 14.

The methods described herein may be implemented in suitable software code that may reside within ROM 122 or 162, RAM 124 or 164, or HD 126 or 166. In addition to those types of memories, the instructions in an embodiment of the present invention may be contained on a data storage device with a different data processing system readable storage medium, such as a floppy diskette. FIG. 2 illustrates a combination of software code elements 204, 206, and 208 that are embodied within a data processing system readable medium 202, on a floppy diskette 200. Alternatively, the instructions may be stored as software code elements on a DASD array, magnetic tape, conventional hard disk drive, electronic read-only memory, optical storage device, CD ROM or other appropriate data processing system readable medium or storage device.

Figure 4:
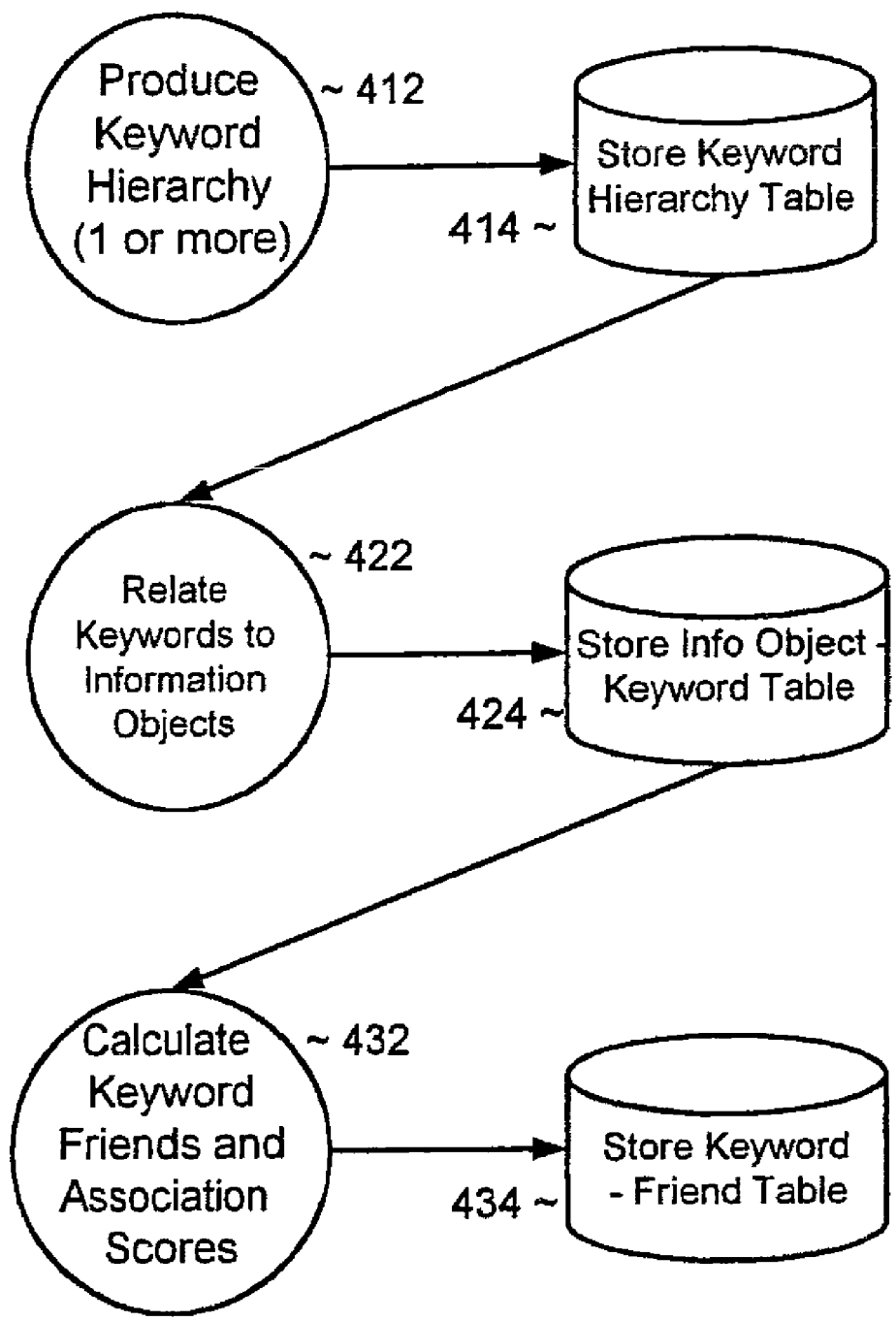
FIG. 4 includes a flow diagram for adding keywords, friends, and information objects to a database.
Figure 5:
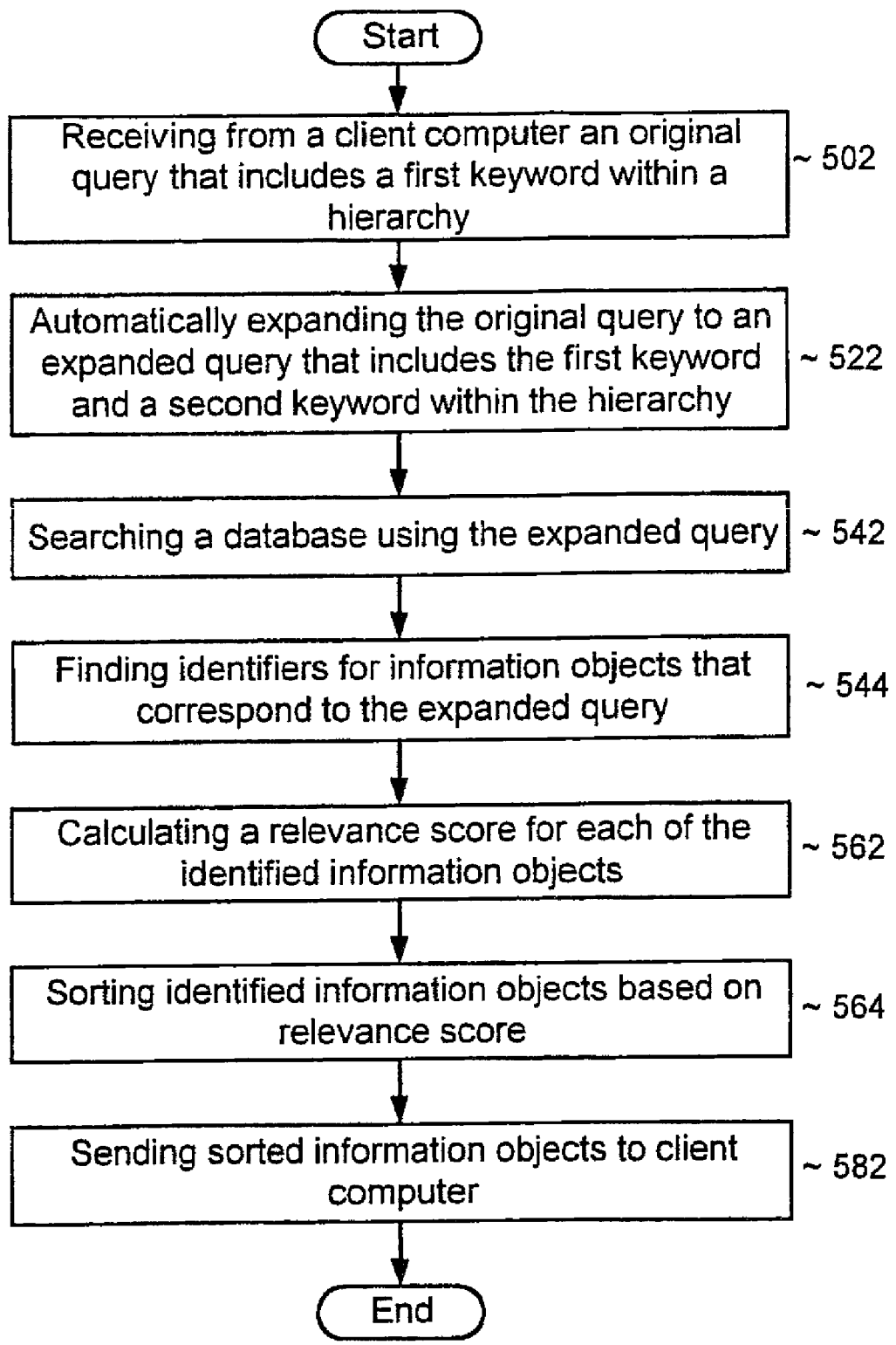
FIG. 5 includes a flow diagram for obtaining information objects related to a keyword and its friends.

In an illustrative embodiment of the invention, the computer-executable instructions may be lines of compiled C++, Java, or other language code. Other architectures may be used. For example, the functions of the client computer 12 may be incorporated into the server computer 16, and vice versa. FIGS. 4 and 5 include illustrations, in the form of flowcharts, of the structures and operations of such a software program.

Communications between the client computer 12 and the server computer 16 can be accomplished using electronic or optical signals. When a user (human) is at the client computer 12, the client computer 12 may convert the signals to a human understandable form when sending a communication to the user and may convert input from a human to appropriate electronic or optical signals to be used by the client computer 12 or the server computer 16.

Attention is now directed to data preparation and system initialization for searching. During data preparation, a master list of keywords (referred to as the Master Keyword List) is generated and arranged into one or more sets of hierarchical relationships or "trees." For example, FIG. 3 includes a tree (hierarchy) with 12 keywords: B, C, . . . , M. The root of the tree is the node A302. Nodes B312, C314, and D316 are the children of node A302. Nodes 321 E321, F322, and G323 are the children of node B312. Nodes H326, I327, and J328 are the children of node D316. Nodes 332 K332, L334, and M336 are the children of node I327. Nodes C314, E321, F322, G323, H326, J328, K332, L334, and M336 have no children.

The dashed lines 310, 320, and 330 are used as a point of reference to divide "generations" of nodes. Each node belongs to a specific "generation" that is equal to the number of ancestor nodes between the given node and the root of the tree. For example, nodes 332, 334, and 336 are members of the third generation (generation=3) because these nodes have three ancestors (nodes 327, 316, and 302). The significance of the generations will become apparent later. Note that FIG. 3 can allow for the identification of the "lowest common ancestor" node. For example, when comparing nodes 332 and 336, the lowest common ancestor node is node 327, which is the parent node for each of nodes 332 and 336. When comparing nodes 326 and 336, the lowest common ancestor node is node 316, which is the parent node to node 326 and the grandparent node of node 336.

The name of the tree can be the root, which in this example can be "tree A." If tree A were the only tree, then {B, C, . . . , M} may also be the master list of keywords. Each tree can be represented as a relational database table, as shown for this example in Table I. Additional tables may be present for other keyword hierarchies.

TABLE 1

Keyword Hierarchy Table

| Keyword | Node Parent | Generation |
|---|---|---|
| B | A | 1 |
| C | A | 1 |
| D | A | 1 |
| E | B | 2 |
| F | B | 2 |
| G | B | 2 |
| H | D | 2 |
| I | D | 2 |
| J | D | 2 |
| K | I | 3 |
| L | I | 3 |
| M | I | 3 |

Referring to FIG. 4, the keyword hierarchy is produced (circle 412) and stored at part of the Keyword Hierarchy Table 414 that may be within database 18.

The database 18 may include a repository of information objects. The information objects themselves may include documents, products, electronic discussion archives, code fragments, and any other computer representations of knowledge or information. Each information object can have a unique identifier, hereafter called the "object ID." In addition, each information object may have other important properties, such as its language, access control parameters, object type (document, software product, etc.), and the like.

A file or database table can specify a set of keywords relevant to each information object, which will be referred to as the "Info Object Keyword Table." All keywords related to the information objects should be members of the Master Keyword List. In other words, keywords are related to information objects (circle 422) and can be stored as part of the Info Object-Keyword Table 424 as seen in FIG. 4. In one embodiment, a relevance rating for each keyword may be provided and can represent the degree of relevance between a keyword and an information object. The relevance rating can be assigned by subject matter experts who assign keywords to information objects and populate the information object repository. This data can be contained in a relational database table where each row contains an object ID, a keyword (or keyword identifier), and a relevance rating (e.g., from 1 to 10), as shown for example in Table II. An object ID can appear multiple times in this table when more than one keyword is considered relevant to the information object.

TABLE II

Relevance Between Object IDs and Keywords.

| Object Id | Keyword | Rating |
|---|---|---|
| obj 1 | C | 8 |
| obj 1 | F | 7 |
| obj 2 | B | 5 |
| obj 2 | H | 9 |
| obj 2 | I | 9 |
| obj 3 | E | 10 |
| obj 4 | J | 9 |
| obj 4 | M | 6 |
| obj 5 | F | 7 |
| obj 5 | J | 4 |
| obj 5 | L | 8 |
| obj 6 | D | 6 |
| obj 6 | C | 8 |
| obj 7 | H | 9 |
| obj 8 | B | 4 |
| obj 8 | D | 8 |

Note that the relevance rating assigned to a given information object-keyword pair need not be the same as the rating assigned to a different information object-keyword pair, even if the keyword is the same in both cases. In Table II, for example, the keyword J is relevant to information object "obj4" with relevance rating of 9, and to "obj5" with relevance rating of 4. This means that keyword J is more relevant to obj4 than to obj5.

The Keyword Hierarchy Tables may be used to produce a set of "friend" keywords (and corresponding association scores between a keyword-friend pair) for every keyword in the Master Keyword List. After a keyword-friend association score can be calculated (circle 432), and that information may be stored in the Keyword-Friend Table 434 of database 18.

Attention is now directed to some of the details in determining keyword-friend association scores. A number of different methods can be used to determine the association scores between keywords and their friends. In one embodiment, the association score may be determined using a tree distance algorithm, further described below. The pairing of keywords with their friends can be maintained in the relational database table 424 (within database 18, for example), with an entry for each keyword/friend pair. Every keyword is a friend of itself, with the maximum possible association score. A keyword's other friends can be given by further entries in the Keyword-Friend Table 434, one for each distinct pair of keywords, along with the association score for that pair. An example consistent with FIG. 3 may include association scores that range from 1 to 10. As shown in Table III.

TABLE III

Keyword Friend Table

| Keyword | Friend | Distance | Score |
|---------|--------|----------|-------|
| B | B | 0 | 10 |
| B | E | 2 | 8 |
| B | F | 2 | 8 |
| B | G | 2 | 8 |
| C | C | 0 | 10 |
| C | B | 6 | 4 |
| C | D | 6 | 4 |
| D | D | 0 | 10 |
| D | H | 2 | 8 |
| D | I | 2 | 8 |
| D | J | 2 | 8 |
| E | E | 0 | 10 |
| E | B | 2 | 8 |
| F | F | 0 | 10 |
| F | B | 2 | 8 |
| G | G | 0 | 10 |
| G | B | 2 | 8 |
| H | H | 0 | 10 |
| H | D | 2 | 8 |
| I | I | 0 | 10 |
| I | K | 1 | 9 |
| I | L | 1 | 9 |
| I | M | 1 | 9 |
| J | J | 0 | 10 |
| J | D | 2 | 8 |
| K | K | 0 | 10 |
| K | I | 1 | 9 |
| L | L | 0 | 10 |
| L | I | 1 | 9 |
| M | M | 0 | 10 |
| M | I | 1 | 9 |

Associated with each link in the keyword hierarchy (represented by the arrows in FIG. 3) is a weight. The weight is equal to the highest generation number in the tree minus the generation of the parent node in the link. For example, the links between node I327 and its children K332, L334, and M336 have a weight equal to 1, which is the highest generation number in the tree (3) minus the generation of the parent node/(2). The dotted horizontal lines in FIG. 3 indicate the generations, and line 310 can correspond to a weight of "3," line 320 can correspond to a weight of "2," and line 330 can correspond to a weight of "1."

The association score between any two keywords in the hierarchy may be determined in two acts:
1. compute the "tree distance" between the two keywords, then
2. transform the tree distance according to a mathematical equation to get the final association score.

To compute the tree distance, the method can use the following algorithm. Trace the ancestry of each node up to the lowest common ancestor. For each link that is used to get to the lowest common ancestor, maintain a sum of the weights. One embodiment may use a sum of the weights squared. (In general, a user can define the tree distance to be the sum of any bias function applied to the weights; power-laws may be particularly useful.)

For example, let $d(x,y)$ denote the tree distance between nodes x and y, where x and y are nodes in the tree. To compute $d(L,H)$, a path can start at node L334 and traces across dotted line 330 to its parent node I327, and then across dotted line 320 to its grandparent node D316. Node D316 is the lowest common ancestor between nodes L334 and H326. Starting at node H326, a path can reach node D316 by crossing line 312. Thus, the distance can be calculated as (1+2) for going from node L328 to node D316, and adding 2 for the distance from node H326 to D316. In more explicit algebraic notation, $d(L,H)=d(L,I)+d(I,H)$
$d(L,H)=d(L,I)+(d(I,D)+d(H,D))$
$d(L,H)=1+2+2$
$d(L,H)=5$.

The following are some more examples:
$d(L,M)=1+1=2$
$d(L,H)=(1+2)+2=5$
$d(L,C)=(1+2+3)+3=9$
$d(H,C)=(2+3)+3=8$
$d(E,C)=(2+3)+3=8$
$d(H,E)=(2+3)+(2+3)=10$
$d(L,E)=(1+2+3)+(2+3)=11$ Other methods may be used to determine the tree distance. Between sibling nodes (child nodes from a common parent node), a symmetric distance matrix may be generated to determine scale of distances between those sibling nodes. That is, the distance between any two children of a parent node can be determined by multiplying appropriate entry in the distance matrix by the sum-of-weights distance.

For example, in FIG. 3, the designers of the tree may choose to define a child distance matrix for node D316 as the following:

|   | H | I | J |
|---|---|---|---|
| H | 1 | 1 | 1.5 |
| I | 1 | 1 | 1 |
| J | 1.5 | 1 | 1 |

This matrix has two properties. First, the diagonal entries are all equal to one. Second, it is symmetric. The elements of the matrix can be denoted by $M(x,y)$, so that (for example) $M(H,J)=1.5$.

A method for calculating an association score between nodes can use this matrix to scale the sum-of-weights distance between the child nodes of the lowest common ancestor. Using only the sum-of-weights distance on the tree in FIG. 3 would produce the result d(L,H)=d(L,J)=5. The child-distance matrix allows the designers of the tree to express a closer relationship between some children than between others. In this example, nodes H326 and I327 are more closely related to each other than to node J328 even though all three share the same parent.

In one example, the method can use the child-distance matrix to scale the distance between children of node D to express the closer relationship between nodes H326 and I327:
d(L,H)=d(L,I)+M(I,H)*d(I,H)
d(L,H)=d(L,I)+M(I,H)*(d(I,D)+d(H,D))
d(L,H)=1+1*(2+2)
d(L,H)=5.
Between nodes J328 and L334, the calculation may be:
d(L,J)=d(L,I)+M(I,J)*d(I,J)
d(L,J)=d(L,I)+M(I,J)*(d(I,D)+d(J,D))
d(L,J)=1+1*(2+2)
d(L,J)=5.
While the matrix may usually be symmetric, symmetry is not required.

This procedure can achieve a desirable effect, in that it gives designers additional flexibility to define quantitative relationships among the keywords in the hierarchy, and these relationships can be used to provide superior information retrieval results. The association scores may be determined automatically by server computer 16 based at least in part upon positions of a keyword and its friend Keyword within the hierarchy.

The method can produce an association score between two keywords by computing a distance between the keywords (using the sum-of-weights or the sum-of-weights plus child-distance matrix method) and then applying a transform to give the highest association scores to those keywords with the lowest values of the tree distance.

One embodiment can use the following transformation. Let C denote the maximum desired association score. The association score between any object and itself is equal to C. Let d denote the tree distance. Let f(d) denote a monotonically increasing function of the argument d, and int(f(d)) denote an integer value of f(d). Let s denote an association score corresponding to tree distance d, and can be given by:

$$s = \max(0, c - \text{int}(f(d)))$$

In this formula, the value of max (x,y) is the greater of the arguments x and y and int(x) is the integer part of the argument x. The value "0" in the equation may be used so that s cannot be negative. In one embodiment, the squares of the weights can be summed to obtain the tree distance d, f(d)= d**0.5 and C=10.

To determine the "friend" keywords for a given keyword, the method can be used to compute the association scores between the given keyword and all other keywords in the hierarchy. The top N of the keywords with the greatest association scores become the set of friend keywords that are stored in a relational database table within database 18. One embodiment can use the keywords with the top 10 association scores to expand the query keywords. A user or code in software or hardware can be set the value of N.

At this point in the process, data preparation and system initialization has been completed. The appropriate information may be stored with database 18 or other storage device having persistent memory.

Query processing can now be performed. It is in this second phase, query processing, that information retrieval actually occurs. A query can be a set of keywords (or keyword IDs), generated by some specific end-user activity for some particular application. The nature of such applications and specific examples are discussed below. The query keywords are members of the Master Keyword List. By using a limited number of keywords from the Master Keyword List, searching can be performed faster compared to free-form searching.

FIG. 5 includes a flow diagram of acts that can be performed when processing a query. Note that some of the acts may be optional and not required for all implementations. The method can comprise receiving from a client computer 12, an original (first) query that includes a first keyword within a hierarchy (block 502). After the original query is received, the server computer 16 can retrieve all the friend keywords (and association scores) for each keyword in the original query. A second keyword from the Keyword-Friend Table 424 can be identified as a friend of the first keyword, although the second keyword may not have been a keyword within the first query.

The method further includes automatically expanding the original query to an expanded (second) query that includes the first keyword and the second keyword within the hierarchy (block 522). In this specific example, note that a third keyword may be present within the Master Keyword List but is not part of the expanded query. The third keyword may not be listed as a friend of the first keyword, or the third keyword may not have had a sufficiently high enough association score compared to other friend keywords of the first keyword.

The complete set of keywords from the original query and their corresponding friend keywords can form the expanded query.

The association scores for the keyword-friend pairs may be used to determine which friends to use but can also be used in relevance scoring that will be described in more detail later.

Below is an example using the hierarchy in FIG. 3 and the association scores in Table III.

| Original Query keywords: | C | | | K | |
|---|---|---|---|---|---|
| Expanded Query keywords: | C | B | D | K | I |
| Association scores: | 10 | 4 | 4 | 10 | 9 |

Keywords C and K can be examples of the first keywords, keywords B, D, and I can be examples of the second keywords, and keywords E, F, G, H, J, L, and M can be examples of the third keywords, which are not part of the expanded query.

After the expanded query has been generated, the method can include searching the database 18 using the expanded query in block 542 of FIG. 5. The method also can include finding identifiers for information objects that correspond to the expanded query (block 544). More specifically, the keywords in the expanded query can be used to identify a set of relevant information objects via the Info Object Keyword Table 424. Only information objects with at least one keyword that is present in the expanded query may be considered relevant to the query.

TABLE IV

Object identifiers, keywords, and relevance ratings.

| Object Id | Keyword | Relevancy Rating |
|---|---|---|
| obj 1 | C | 8 |
| obj 1 | F | 7 |
| obj 2 | B | 5 |
| obj 2 | J | 9 |
| obj 2 | I | 9 |

TABLE IV-continued

Object identifiers, keywords, and relevance ratings.

| Object Id | Keyword | Relevancy Rating |
|---|---|---|
| obj 6 | D | 6 |
| obj 6 | C | 8 |
| obj 8 | B | 4 |
| obj 8 | D | 8 |

Table IV includes an exemplary set of relevant information objects corresponding to the expanded query. The relevance rating can be a rating of how relevant a keyword is to a specific information object. Note that obj8 is relevant to the expanded query but not to the original query because obj8 only includes keywords B and D (second keywords) as relevant keywords.

Next, the method can calculate a relevance score for each of the identified information objects (block 562). There are many possible formulae for this calculation. In many instances, a weighted vector may be used for the relevance score. The weighted vector can be a product between two vectors of dimensionality D, where D is the total number of distinct keywords in the master keyword list, and each vector element is the relevance score for that keyword or zero if the keyword is absent. Users may find it useful to choose a formula which includes appropriate normalization to account for variable parameters that should not affect the final score spuriously, such as the number of keywords for a given information object. This consideration suggests the following formula for the relevance score R:

$$R = \frac{\sum_{i=1}^{M} k_i q_i}{K}$$

where:
{K} is the set of keywords associated with the information object;
{k} is the set of relevance ratings for the information object keywords in {K};
K=|{K}| is the number of keywords associated with the information object;
{Q} is the set of keywords in the expanded query;
{q} is the set of association scores for the expanded query keywords in {Q};
{M} is the set of keywords from the intersection of sets {K} and {K};
M=|{M}| is the number keywords in the set {M} (i.e. the number of matches);
$\{k_i\}$, i=1, 2, ..., M is the subset of {k} corresponding to the elements of {K} in {M}; and
$\{q_i\}$, i=1, 2, ..., M is the subset of {q} corresponding to the elements of {Q} in {M}.

The relevance score is determined as follows: find the sum, over each expanded query keyword that matches an information object keyword, of the product of the keyword's association score for the query and its relevance rating for the information object; and divide the sum by the number of keywords associated with the information object. This last act provides appropriate normalization to avoid arbitrarily enhancing the score of information objects that have a large number of keywords. Note that it is not necessary to normalize by the number of query keywords, since this is a constant for a given query. Note that the equation give above is not the only way to determine a relevance score, and therefore, should not be construed as a limiting. Table V includes the relevance scores obtained in this fashion for the given set of eligible information objects in Table IV and the expanded query.

TABLE V

Relevance Score Table.

| Object Id | Relevance Score |
|---|---|
| obj 1 | 40 |
| obj 2 | 33.7 |
| obj 6 | 52 |
| obj 8 | 24 |

The method may further include sorting the identified information objects based on the relevance scores (block 564). The list of eligible information objects can be sorted from highest to lowest relevance score. After sorting, the method may send the sorted information object to the client computer (block 582). The resulting list should provides the object IDs of all relevant information objects for the expanded query, in order of relevance, based on the original query. Although the calculating of the relevance score and sorting the identified information objects is optional, the information objects, sorted by relevancy score aid the user at the client computer by indicating the degree of relevance based on relevancy score. The final list for the example of Table V can be given by Table VI.

TABLE VI

Final List of Sorted Information Objects.

| Object Id | Relevance Score |
|---|---|
| obj 6 | 52 |
| obj 1 | 40 |
| obj 2 | 33.7 |
| obj 8 | 24 |

The server computer 16 may send the client computer 12 the list seen in Table VI or a derivative of it. The information object Ids may include an alpha-numeric representation, a catalog number, or be replaced by a title, or even the information object itself (or the first few words of it) when information is seen by a user at client computer 16. Therefore sending an information object ID should be construed as including any one or more of the pieces of information listed in this paragraph.

Filtering acts may be used as an optimal part of the method. Filtering may select information objects by language, security level, length of document, or the like. The user may define the filtering criterion. The filtering criterion may be sent from the client computer 12 to the server computer 16 with the original query.

Other specific embodiments are presented to illustrate some of the other features of the keyword-friend query method and system. One embodiment may serve as part of a suite of information retrieval systems for a corporate knowledge management system. The role of the method in this system is to provide employees, business partners, and customers of the corporation with efficient access to information objects that are relevant to a particular topic or user query. Access to the method and system can be through a software application made available on the World Wide Web computer network via the HTTP communications protocol.

In this embodiment there may be three hierarchies: one hierarchy may correspond to the subject matter category addressed by the information object ("category hierarchy"), another hierarchy may correspond to the project phase addressed by the information object ("phase hierarchy"), and still another hierarchy may correspond the role, or intended audience, of the information object ("role hierarchy"). Each hierarchy is described by a database table that lists the unique identifiers of the keywords in that hierarchy, along with the unique identifiers of the parent keywords. The keyword corresponding to the root of the tree may have no parent keyword. The translation from unique keyword identifier to the keyword text can be provided by means of another database table.

A further aspect of this embodiment can be a "keyword-type" weight value assigned to each of the keyword hierarchies. This can allow some types of keywords to be more significant than others; for example, a keyword of type "category" can be given a weight of 2 while "role" and "phase" keywords are given a weight of 1. All of the keywords in a given hierarchy can have an identical keyword-type weight. This weight value may be separate and in addition to the association score of a specific keyword for a specific information object, and can be used as an additional multiplicative factor for each term in the summation used in the relevance score.

In one application of this embodiment, a user at client computer 12 may formulate a query by selecting one or more keywords from the three available hierarchies. The keywords can be displayed on a screen and selected by selection boxes displayed on the user's HTML browser. The keywords he or she selects can then be submitted to the server computer 16 that can search database 18 for the relevant information objects. The relevant information objects that are returned can then be sent from the server computer 16 and received by the client computer 12 where the user can see the results.

In another application of this embodiment, the query may be formulated automatically according to the user's context on the Web site. By means of a series of questions presented to the user as they navigate the Web site, a query can be formulated based upon the question responses. For example, a series of questions may reveal the user's interest in a particular subject matter category, and the keyword corresponding to that category can form the query that is submitted for processing. The relevant information objects that are returned are then presented to the user. Alternatively, the actions of the user at the website can be tracked and information objects be presented to the user without having to ask any questions or receive a query from the user.

Embodiments of the present invention have advantages over the prior art in the field of information retrieval. The methods can make use of the relationships among the keywords associated to each information object. These relationships can be expressed in the hierarchies to which the keywords belong. By taking advantage of this information, the methods can be used to find information objects in the repository that are close but not exact matches to an original query.

The embodiments do not require interactive participation from the user beyond the specification of the original query. The invention may automatically expand the scope of the original query to include keywords with related meanings, so that matches can occur even on keywords the user did not think to enter in the original query.

The methods may require only a few operations to compute a relevance score for an information object. Therefore, the methods can be performed on a data processing system in a time efficient manner.

A further advantage seen with embodiments of the present invention is the ability to create derivatives to address other problems or to be used in other fields. Direct mail, electronic mail, and the World Wide Web provide marketers with an opportunity to target product offers to specific customers. These offers can include product recommendations. The process of constructing a product recommendation can be analogous to the process of information retrieval. Therefore, the methods can be used to provide product recommendations. The products (or more specifically unique product codes) themselves can serve the role of keywords. The product hierarchy maintained by many retailers can be used to establish the relationships among the keywords. The form of a query may be a set of products in which a customer has expressed interest (through purchase, request for information, etc.). At least one of the methods previously described can be used to return a list of related information objects (which are product identifiers) to the customer as a kind of product recommendation. Such recommendation may be valid under an assumption that consumers will be interested in products similar to those that they have purchased or browsed in the past. Many retailers maintain product hierarchies that express the similarity of items that are closely related in a tree.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data preparation method useful for information retrieval, comprising:
   at a server computer, arranging a master list of keywords into one or more trees, at least one of which representing a keyword hierarchy;
   relating a set of keywords to each information object of a set of information objects stored in a repository, the set of keywords being members of the master list of keywords;
   determining friend keywords for each keyword in the master list of keywords, the determining comprising computing association scores between a given keyword and all other keywords in the keyword hierarchy based at least in part upon positions of each keyword-friend pair within the keyword hierarchy and a tree distance between the positions, each of the association scores representing a degree of association of the given keyword and a friend keyword in the keyword hierarchy;
   automatically expanding an original query to produce an expanded query, the original query being generated by end-user activity at a client computer communicatively connected to the server computer over a network connection, the original query comprising a first keyword, the expanded query comprising the first keyword and a second keyword, the second keyword being associated with the first keyword from the original query in a keyword-friend pair according to the keyword hierarchy, the keyword-friend pair having an association score that meets or exceeds a predetermined value, wherein the second keyword is not in the original query; and searching the repository to identify information objects that correspond to the expanded query.

2. The method according to claim 1, wherein nodes in the keyword hierarchy are divided into generations, wherein each of the nodes belongs to a specific generation that is equal to a number of ancestor nodes between the node and a root of the keyword hierarchy.

3. The method according to claim 2, wherein determining an association score between two keywords in the keyword hierarchy further comprises:

computing a tree distance between the two keywords in the keyword hierarchy; and transforming the tree distance into the association score utilizing a weight calculated from the generations.

4. The method according to claim 1, further comprising: maintaining distinct keyword-friend pairs and corresponding association scores in a relational database table.

5. The method according to claim 4, wherein every keyword is a friend of itself with a maximum possible association score.

6. The method according to claim 1, wherein the relating further comprises:

for every information object stored in the repository:
forming information object-keyword pairs; and
assigning each information object-keyword pair a relevance rating representing a degree of relevance there-between.

7. The method according to claim 6, wherein the searching further comprises:

utilizing the relevance rating to search for information objects that are relevant to the expanded query that is automatically expanded from the original query.

8. The method according to claim 6, wherein each of the information objects has a unique identifier.

9. A computer program product comprising at least one non-transitory computer readable medium storing instructions translatable by a processor of a server computer to perform:

arranging a master list of keywords into one or more trees, at least one of which representing a keyword hierarchy;

relating a set of keywords to each information object of a set of information objects stored in a repository, the set of keywords being members of the master list of keywords;

determining friend keywords for each keyword in the master list of keywords, the determining comprising computing association scores between a given keyword and all other keywords in the keyword hierarchy based at least in part upon positions of each keyword-friend pair within the keyword hierarchy and a tree distance between the positions, each of the association scores representing a degree of association of the given keyword and a friend keyword in the keyword hierarchy;

automatically expanding an original query to produce an expanded query, the original query being generated by end-user activity at a client computer communicatively connected to the server computer over a network connection, the original query comprising a first keyword, the expanded query comprising the first keyword and a second keyword, the second keyword being associated with the first keyword from the original query in a keyword-friend pair according to the keyword hierarchy, the keyword-friend pair having an association score that meets or exceeds a predetermined value, wherein the second keyword is not in the original query; and searching the repository to identify information objects that correspond to the expanded query.

10. The computer program product of claim 9, wherein nodes in the keyword hierarchy are divided into generations, wherein each of the nodes belongs to a specific generation that is equal to a number of ancestor nodes between the node and a root of the keyword hierarchy.

11. The computer program product of claim 10, wherein determining an association score between two keywords in the keyword hierarchy further comprises:

computing a tree distance between the two keywords in the keyword hierarchy; and transforming the tree distance into the association score utilizing a weight calculated from the generations.

12. The computer program product of claim 9, wherein the instructions are further translatable by the processor to perform:

maintaining distinct keyword-friend pairs and corresponding association scores in a relational database table.

13. The computer program product of claim 12, wherein every keyword is a friend of itself with a maximum possible association score.

14. The computer program product of claim 9, wherein the instructions are further translatable by the processor to perform:

utilizing a relevance rating to search for information objects that are relevant to the expanded query that is automatically expanded from the original query, wherein the relevance rating represents a degree of relevance between each keyword in the expanded query and an information object stored in the repository.

15. A system, comprising:

a processor; and at least one non-transitory computer readable medium storing instructions translatable by the processor to perform:

arranging a master list of keywords into one or more trees, at least one of which includes nodes representing a keyword hierarchy;

relating a set of keywords to each information object of a set of information objects stored in a repository, the set of keywords being members of the master list of keywords;

determining friend keywords for each keyword in the master list of keywords, the determining comprising computing association scores between a given keyword and all other keywords in the keyword hierarchy based at least in part upon positions of each keyword-friend pair within the keyword hierarchy and a tree distance between the positions, each of the association scores representing a degree of association of the given keyword and a friend keyword in the keyword hierarchy;

automatically expanding an original query to produce an expanded query, the original query being generated by end-user activity at a client computer communicatively connected to the system over a network connection, the original query comprising a first keyword, the expanded query comprising the first keyword and a second keyword, the second keyword being associated with the first keyword from the original query in a keyword-friend pair according to the keyword hierarchy, the keyword-friend pair having an association score that meets or exceeds a predetermined value, wherein the second keyword is not in the original query; and searching the repository to identify information objects that correspond to the expanded query.

16. The system of claim 15, wherein the nodes representing the keyword hierarchy are divided into generations, wherein each of the nodes belongs to a specific generation that is equal to a number of ancestor nodes between the node and a root of the keyword hierarchy, and wherein the instructions are further translatable by the processor to perform:

computing a tree distance between two keywords in the keyword hierarchy; and transforming the tree distance into the association score utilizing a weight calculated from the generations.

17. The system of claim 15, wherein the instructions are further translatable by the processor to perform:

utilizing a relevance rating to search for information objects that are relevant to the expanded query that is automatically expanded from the original query, wherein the relevance rating represents a degree of relevance between each keyword in the expanded query and an information object stored in the repository.

* * * * *